US009116574B2

(12) United States Patent
Wei et al.

(10) Patent No.: US 9,116,574 B2
(45) Date of Patent: Aug. 25, 2015

(54) OPTICAL TOUCH DEVICE AND GESTURE DETECTING METHOD THEREOF

(71) Applicant: Wistron Corporation, New Taipei (TW)

(72) Inventors: Shou-Te Wei, New Taipei (TW); Shang-Chin Su, New Taipei (TW); Sheng-Hsien Hsieh, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 108 days.

(21) Appl. No.: 14/093,508

(22) Filed: Dec. 1, 2013

(65) Prior Publication Data

US 2015/0097811 A1 Apr. 9, 2015

(30) Foreign Application Priority Data

Oct. 7, 2013 (TW) .............................. 102136249 A

(51) Int. Cl.
*G06F 3/042* (2006.01)
*G06F 3/0488* (2013.01)
*G06K 9/00* (2006.01)

(52) U.S. Cl.
CPC ............ *G06F 3/042* (2013.01); *G06F 3/04883* (2013.01); *G06K 9/00335* (2013.01)

(58) Field of Classification Search
CPC ......... G06F 3/042; G06F 3/017; G06F 3/044; G06F 3/04883; G06F 3/0488; G06K 9/00335
USPC ..................... 345/173–178; 178/18.01–18.09, 178/20.01–20.04
See application file for complete search history.

(56) References Cited

U.S. PATENT DOCUMENTS

| 7,898,522 | B2 * | 3/2011 | Hildreth et al. ................ 345/156 |
| 8,749,499 | B2 * | 6/2014 | Ameling et al. ............... 345/173 |
| 2010/0066763 | A1 * | 3/2010 | MacDougall et al. ........ 345/656 |
| 2010/0201639 | A1 | 8/2010 | Huang |
| 2011/0298724 | A1 * | 12/2011 | Ameling et al. ............... 345/173 |
| 2013/0027327 | A1 | 1/2013 | Chang |
| 2013/0142383 | A1 | 6/2013 | Viswanathan |

FOREIGN PATENT DOCUMENTS

| TW | 201030579 A1 | 8/2010 |
| TW | 201207702 A1 | 2/2012 |
| TW | 201305878 A1 | 2/2013 |

OTHER PUBLICATIONS

Office action mailed on Apr. 24, 2015 for the Taiwan application No. 102136249, filed: Oct. 7, 2013, p. 1 line 14, p. 2-5 and p. 6 line 1-13 and line 18-25 Translation.

\* cited by examiner

*Primary Examiner* — Vijay Shankar

(74) *Attorney, Agent, or Firm* — Winston Hsu; Scott Margo

(57) ABSTRACT

A gesture detecting method is adapted to an optical touch device. The optical touch device includes an indication plane and two image sensing units disposed at two corners of one side of the indication plane. The gesture detecting method includes steps of sensing two images of a gesture by the two image sensing units, wherein the gesture is performed on the indication plane; determining whether at least two touch points exist in one of the two images; if at least two touch points exist in one of the two images, generating a quadrangle according to a far left boundary and a far right boundary of each of the two images; calculating a reference radius of a reference circle corresponding to the quadrangle; and determining whether the gesture is a grab gesture according to a variance of the reference radius.

14 Claims, 3 Drawing Sheets

OPTICAL TOUCH DEVICE AND GESTURE DETECTING METHOD THEREOF

BACKGROUND OF THE INVENTION

1. Field of the Invention

The invention relates to an optical touch device and a gesture detecting method thereof and, more particularly, to an optical touch device and a gesture detecting method thereof capable of determining a grab gesture rapidly and accurately.

2. Description of the Prior Art

Since consumer electronic products have become more and more lighter, thinner, shorter, and smaller, there is no space on these products for containing a conventional input device, such as mouse, keyboard, etc. With development of touch technology, in various kinds of consumer electronic products (e.g. display device, all-in-one device, mobile phone, personal digital assistant (PDA), etc.), a touch device has become a main tool for data input. Compared with other touch design, such as a resistive touch design, a capacitive touch design, an ultrasonic touch design, or a projective touch design, an optical touch design has lower cost and is easier to use, especially for large-size touch display.

A conventional optical touch device senses a touch point indicated by a touch object (e.g. finger or stylus) on an indication plane by two image sensing units arranged oppositely. When the image sensing units sense the touch object on the indication plane, a processing unit of the optical touch device can calculate the touch point indicated by the touch object accordingly. When the conventional optical touch device is used for sensing one single touch point performed by one single finger, the position of the touch point can be calculated by a triangulation method easily. However, once there are multiple touch points performed by two or more than two fingers, it is complicated to identify and calculate positions of the touch points and this could result in mis-identification and interference.

SUMMARY OF THE INVENTION

The invention provides an optical touch device and a gesture detecting method thereof capable of determining a grab gesture rapidly and accurately, so as to solve the aforesaid problems.

According to the claimed invention, a gesture detecting method is adapted to an optical touch device, the optical touch device comprises an indication plane and two image sensing units disposed at two corners of one side of the indication plane, the gesture detecting method comprises steps of sensing two images of a gesture by the two image sensing units, wherein the gesture is performed on the indication plane; determining whether at least two touch points exist in one of the two images; if at least two touch points exist in one of the two images, generating a quadrangle according to a far left boundary and a far right boundary of each of the two images; calculating a reference radius of a reference circle corresponding to the quadrangle; and determining whether the gesture is a grab gesture according to a variance of the reference radius.

According to the claimed invention, the reference radius is calculated by an equation as follows, $r=2A/S$, r represents the reference radius, A represents an area of the quadrangle, and S represents a perimeter of the quadrangle.

According to the claimed invention, the gesture detecting method further comprises steps of calculating a reference center of the reference circle; and calculating a moving trajectory of the gesture according to a position variance of the reference center.

According to the claimed invention, the gesture detecting method further comprises steps of calculating an angular bisector between the far left boundary and the far right boundary of each of the two images, so as to obtain two angular bisectors; and taking an intersection point of the two angular bisectors to be the reference center.

According to the claimed invention, when the reference radius decreases, the gesture is determined as a grab gesture.

According to the claimed invention, when the reference radius increases, the gesture is determined as a release gesture.

According to the claimed invention, the gesture detecting method further comprises steps of providing a look-up table, wherein the look-up table records a sensing range of each of the image sensing units and an angle range corresponding to the sensing range; and looking the far left boundary and the far right boundary of each of the two images up in the look-up table and calculating four straight lines according to the sensing range and the angle range, wherein the four straight lines intersect to form the quadrangle.

According to the claimed invention, an optical touch device comprises an indication plane, a gesture being performed on the indication plane; two image sensing units disposed at two corners of one side of the indication plane, the two image sensing units being used for sensing two images of the gesture; and a processing unit electrically connected to the two image sensing units, the processing unit being used for determining whether at least two touch points exist in one of the two images; if at least two touch points exist in one of the two images, the processing unit generating a quadrangle according to a far left boundary and a far right boundary of each of the two images, calculating a reference radius of a reference circle corresponding to the quadrangle, and determining whether the gesture is a grab gesture according to a variance of the reference radius.

According to the claimed invention, the reference radius is calculated by an equation as follows, $r=2A/S$, r represents the reference radius, A represents an area of the quadrangle, and S represents a perimeter of the quadrangle.

According to the claimed invention, the processing unit calculates a reference center of the reference circle and calculates a moving trajectory of the gesture according to a position variance of the reference center.

According to the claimed invention, the processing unit calculates an angular bisector between the far left boundary and the far right boundary of each of the two images, so as to obtain two angular bisectors, and takes an intersection point of the two angular bisectors to be the reference center.

According to the claimed invention, when the reference radius decreases, the processing unit determines that the gesture is a grab gesture.

According to the claimed invention, when the reference radius increases, the processing unit determines that the gesture is a release gesture.

According to the claimed invention, the optical touch device further comprises a storage unit electrically connected to the processing unit, the storage unit is used for storing a look-up table, wherein the look-up table records a sensing range of each of the image sensing units and an angle range corresponding to the sensing range, the processing unit looks the far left boundary and the far right boundary of each of the two images up in the look-up table and calculates four straight lines according to the sensing range and the angle range, the four straight lines intersect to form the quadrangle.

As mentioned in the above, the invention takes multiple touch points of a gesture performed on the indication plane to be a circle (i.e. the aforesaid reference circle) and then determines whether the gesture is a grab gesture according to the variance of the reference radius of the reference circle. Accordingly, no matter where the gesture is performed on the indication plane, the invention can determine whether the gesture is a grab gesture rapidly and accurately. Furthermore, the invention can further utilize the position variance of the reference center of the reference circle to calculate the moving trajectory of the gesture and then determine a moving direction and a shape of the gesture according to the moving trajectory, so as to provide various gesture definitions and applications thereof.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
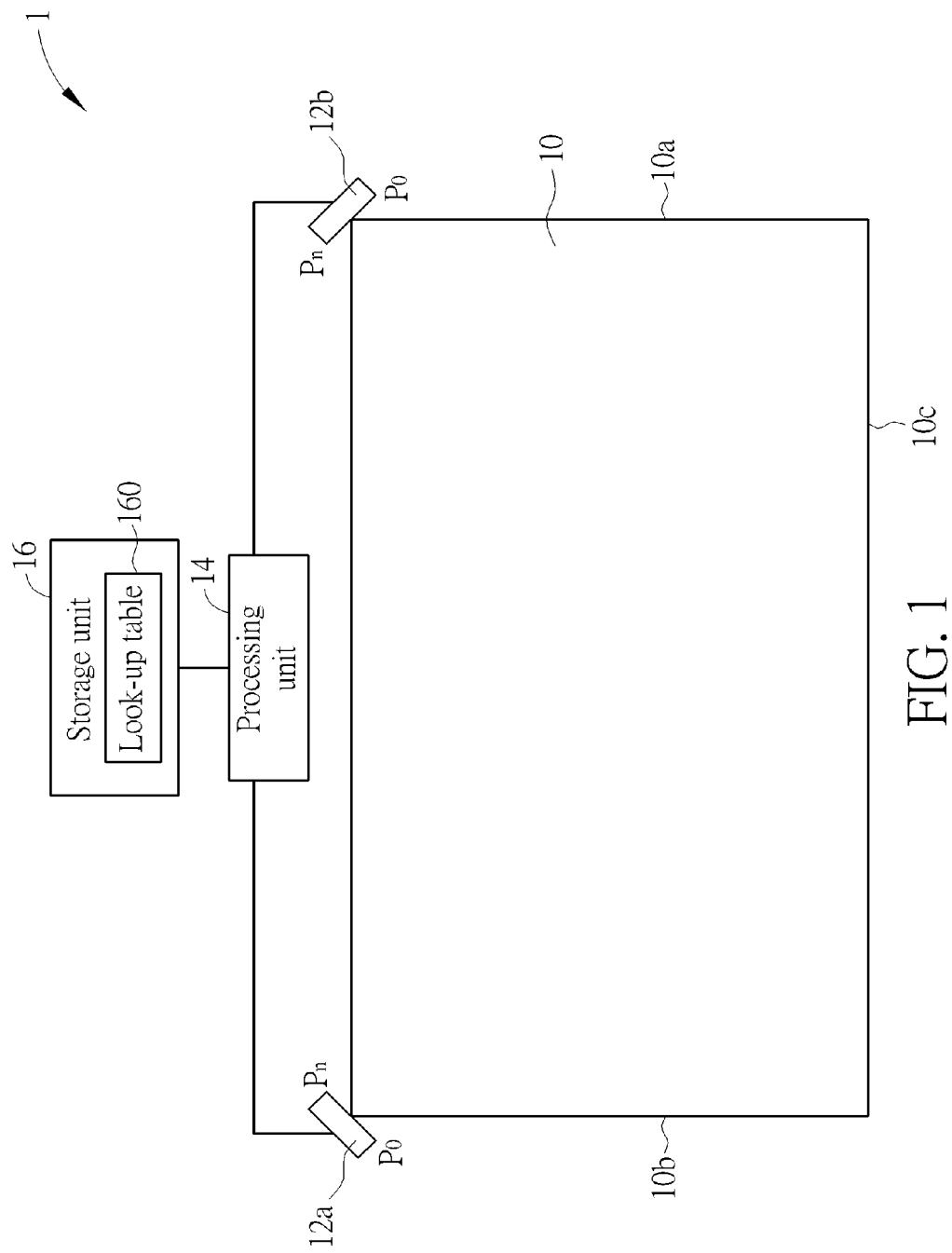
FIG. 1 is a schematic diagram illustrating an optical touch device according to an embodiment of the invention.
Figure 2:
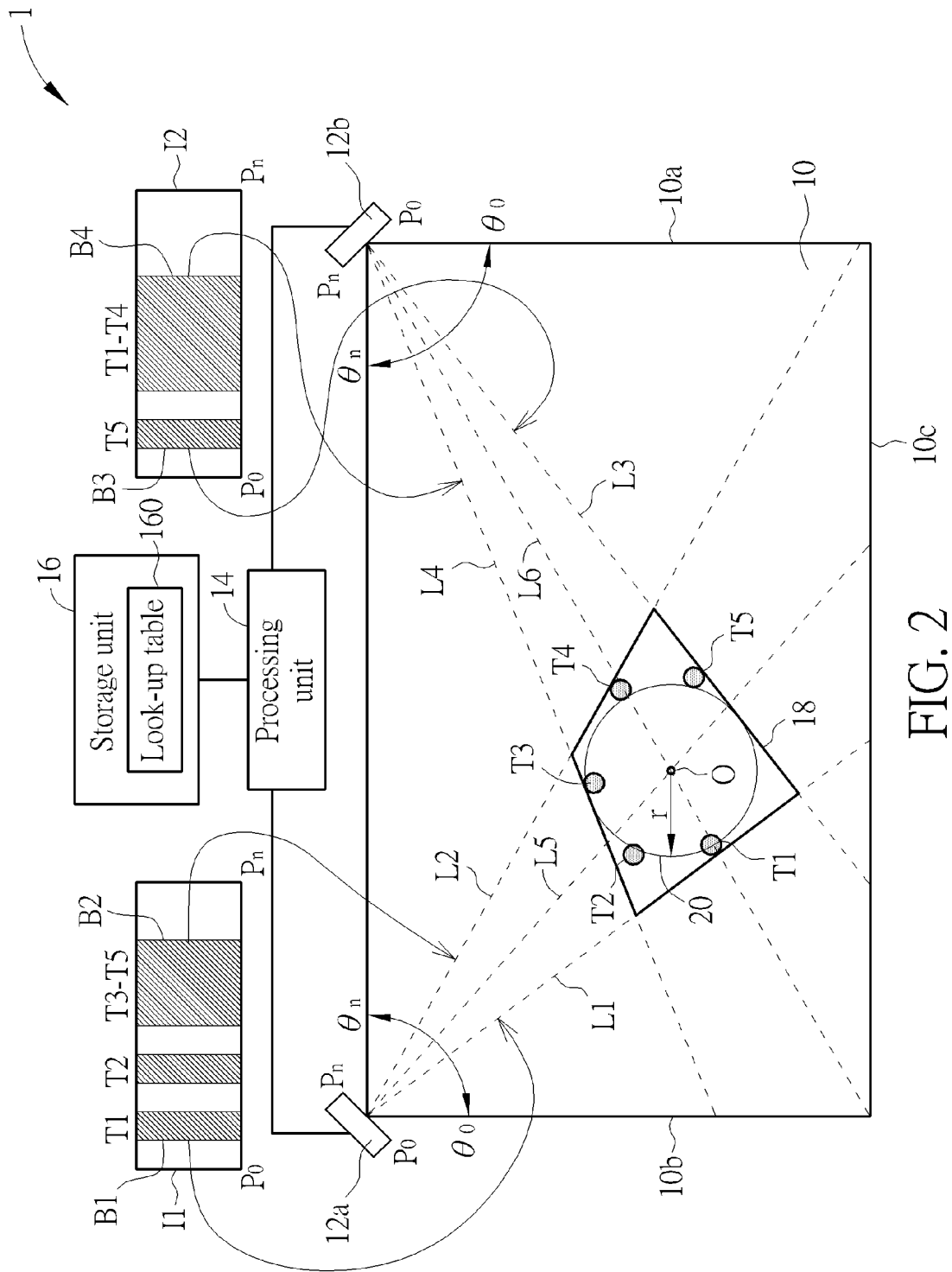
FIG. 2 is a schematic diagram illustrating a touch operation with five touch points performed on the indication plane.

Referring to FIGS. 1 and 2, FIG. 1 is a schematic diagram illustrating an optical touch device 1 according to an embodiment of the invention, and FIG. 2 is a schematic diagram illustrating a touch operation with five touch points T1-T5 performed on the indication plane 10.

As shown in FIG. 1, the optical touch device 1 comprises an indication plane 10, two image sensing units 12a, 12b, a processing unit 14 and a storage unit 16. The two image sensing units 12a, 12b are disposed at two corners of one side of the indication plane 10. The processing unit 14 is electrically connected to the two image sensing units 12a, 12b and the storage unit 16. In practical applications, the indication plane 10 may be a display panel (e.g. liquid crystal display panel), a white board, a black board, a projecting screen or other planes for a user to perform touch operation; the image sensing units 12a, 12b may be, but not limited to, charge-coupled device (CCD) sensors or complementary metal-oxide semiconductor (CMOS) sensors; the processing unit 14 may be a processor or a controller with data calculation/processing function; the storage unit 16 may be a hard disc, a memory or other storage device capable of storing data. In practical applications, a plurality of light emitting units (e.g. light emitting diodes) may be disposed adjacent to the two image sensing units 12a, 12b a light bar may be disposed around the indication plane 10, so as to provide light for touch operation. Once the light emitting units are disposed adjacent to the two image sensing units 12a, 12b, there may be light reflecting frame or light absorbing frame disposed around the indication plane 10 based on practical applications.

The storage unit 16 is used for storing a look-up table 160, wherein the look-up table 160 records a sensing range of each of the image sensing units 12a, 12b and an angle range corresponding to the sensing range, as shown in the following table 1. In practical applications, the sensing range $P_0$-$P_n$ of the image sensing unit 12a covers the range between two sides 10a, 10c of the indication plane 10 and the corresponding angle range $\theta_0$-$\theta_n$ is the included angle 0°-90° between the two sides 10a, 10c; the sensing range $P_0$-$P_n$ of the image sensing unit 12b covers the range between two sides 10b, 10c of the indication plane 10 and the corresponding angle range $\theta_0$-$\theta_n$ is the included angle 0°-90° between the two sides 10b, 10c.

TABLE 1

| Look-up table 160 | | | |
| --- | --- | --- | --- |
| Image sensing unit 12a | | Image sensing unit 12b | |
| Sensing range | Angle range | Sensing range | Angle range |
| $P_0$ | $\theta_0$ | $P_0$ | $\theta_0$ |
| $P_1$ | $\theta_1$ | $P_1$ | $\theta_1$ |
| $P_2$ | $\theta_2$ | $P_2$ | $\theta_2$ |
| ... | ... | ... | ... |
| $P_{n-2}$ | $\theta_{n-2}$ | $P_{n-2}$ | $\theta_{n-2}$ |
| $P_{n-1}$ | $\theta_{n-1}$ | $P_{n-1}$ | $\theta_{n-1}$ |
| $P_n$ | $\theta_n$ | $P_n$ | $\theta_n$ |

As shown in FIG. 2, when a user performs a gesture on the indication plane 10 to execute a touch operation, the gesture forms five touch points T1-T5 on the indication plane 10, wherein the five touch points are corresponding to five fingers of the user, respectively. At this time, the two image sensing units 12a, 12b sense two images I1, I2 of the gesture, wherein three touch points T3-T5 overlap in the image I1 and four touch points T1-T4 overlap in the image I2. Afterward, the processing unit 14 determines whether at least two touch points exist in one of the two images I1, I2. If at least two touch points exist in one of the two images I1, I2, a gesture detecting mold of the invention will be turned on. At this time, the processing unit 14 generates a quadrangle 18 according to a far left boundary and a far right boundary of each of the two images I1, I2. As shown in FIG. 2, at least two touch points exist in each of the two images I1, I2, wherein the far left boundary in the image I1 is B1, the far right boundary in the image I1 is B2, the far left boundary in the image I2 is B3, and the far right boundary in the image I2 is B4. Therefore, the processing unit 14 generates the quadrangle 18 according to the far left boundary B1 and the far right boundary B2 of the image I1 and the far left boundary B3 and the far right boundary B4 of the image I2.

In this embodiment, the processing unit 14 can look the far left boundary and the far right boundary of each of the two images I1, I2 up in the look-up table 160 and calculate four straight lines L1-L4 according to the sensing range $P_0$-$P_n$ and the angle range $\theta_0$-$\theta_n$ of the look-up table 160, wherein the four straight lines L1-L4 intersect to form the quadrangle 18. As shown in FIG. 2, the processing unit 14 can look the far left boundary B1 and the far right boundary B2 of the image I1 up in the look-up table 160 and calculate two straight lines L1-L2 according to the sensing range $P_0$-$P_n$ and the angle range $\theta_0$-$\theta_n$ of the look-up table 160. Similarly, the processing unit 14 can look the far left boundary B3 and the far right boundary B4 of the image I2 up in the look-up table 160 and calculate two straight lines L3-L4 according to the sensing range $P_0$-$P_n$ and the angle range $\theta_0$-$\theta_n$ of the look-up table 160. It should be noted that how to calculate the four straight lines L1-L4 according to the sensing range $P_0$-$P_n$ and the angle range $\theta_0$-$\theta_n$ of the look-up table 160 is well known by one skilled in the art and it will not be depicted in detail herein. Then, the processing unit 14 can calculate a reference radius of a reference circle 20 corresponding to the quadrangle 18 through the following equation 1.

$$r=2A/S,$$

wherein r represents the reference radius, A represents an area of the quadrangle 18, and S represents a perimeter of the quadrangle 18.

According to the aforesaid manner, the processing unit 14 can calculate a plurality of reference radii r at different time correspondingly and then determine whether the gesture is a grab gesture according to a variance of the reference radius r. For example, when the reference radius r decreases from time t0 to time t1 (e.g. the reference radius is 10 cm at time t0 and 5 cm at time t1), it means that the five touch points T1-T5 move close to each other on the indication plane 10 and the processing unit 14 will determine that the gesture is a grab gesture, so as to execute a function corresponding to the grab gesture; when the reference radius r increases from time t0 to time t1 (e.g. the reference radius is 5 cm at time t0 and 10 cm at time t1), it means that the five touch points T1-T5 move away from each other on the indication plane 10 and the processing unit 14 will determine that the gesture is a release gesture, so as to execute a function corresponding to the release gesture.

Furthermore, the processing unit 14 may further calculate a reference center O of the reference circle 20 and calculate a moving trajectory of the gesture according to a position variance of the reference center O. In this embodiment, the processing unit 14 may calculate an angular bisector between the far left boundary and the far right boundary of each of the two images I1, I2, so as to obtain two angular bisectors L5, L6, and takes an intersection point of the two angular bisectors L5, L6 to be the reference center O. As shown in FIG. 2, the processing unit 14 calculates the angular bisector L5 between the far left boundary B1 (corresponding to the straight line L1) and the far right boundary B2 (corresponding to the straight line L2) of the image I1 and calculates the angular bisector L6 between the far left boundary B3 (corresponding to the straight line L3) and the far right boundary B4 (corresponding to the straight line L4) of the image I2. Accordingly, the processing unit 14 can calculate a plurality of reference centers O at different time correspondingly, calculate the moving trajectory of the gesture according to the position variance of the reference center O, and determine a moving direction and a shape of the gesture according to the moving trajectory, so as to provide various gesture definitions and applications thereof (e.g. upward gesture, downward gesture, leftward gesture, rightward gesture, circular gesture, etc.). In this embodiment, the invention may record the position data of all reference centers O calculated within a span of time and then calculate the moving trajectory of the gesture by RANdom SAmple Consensus (RANSAC), wherein RANSAC is well known by one skilled in the art and it will not be depicted in detail herein.

In another embodiment, the invention may also enable the reference circle 20 to contact any two of the four straight lines L1-L4 tangentially and then take an intersection point of two normal lines related to two tangent points to be the reference center O of the reference circle 20.

Figure 3:
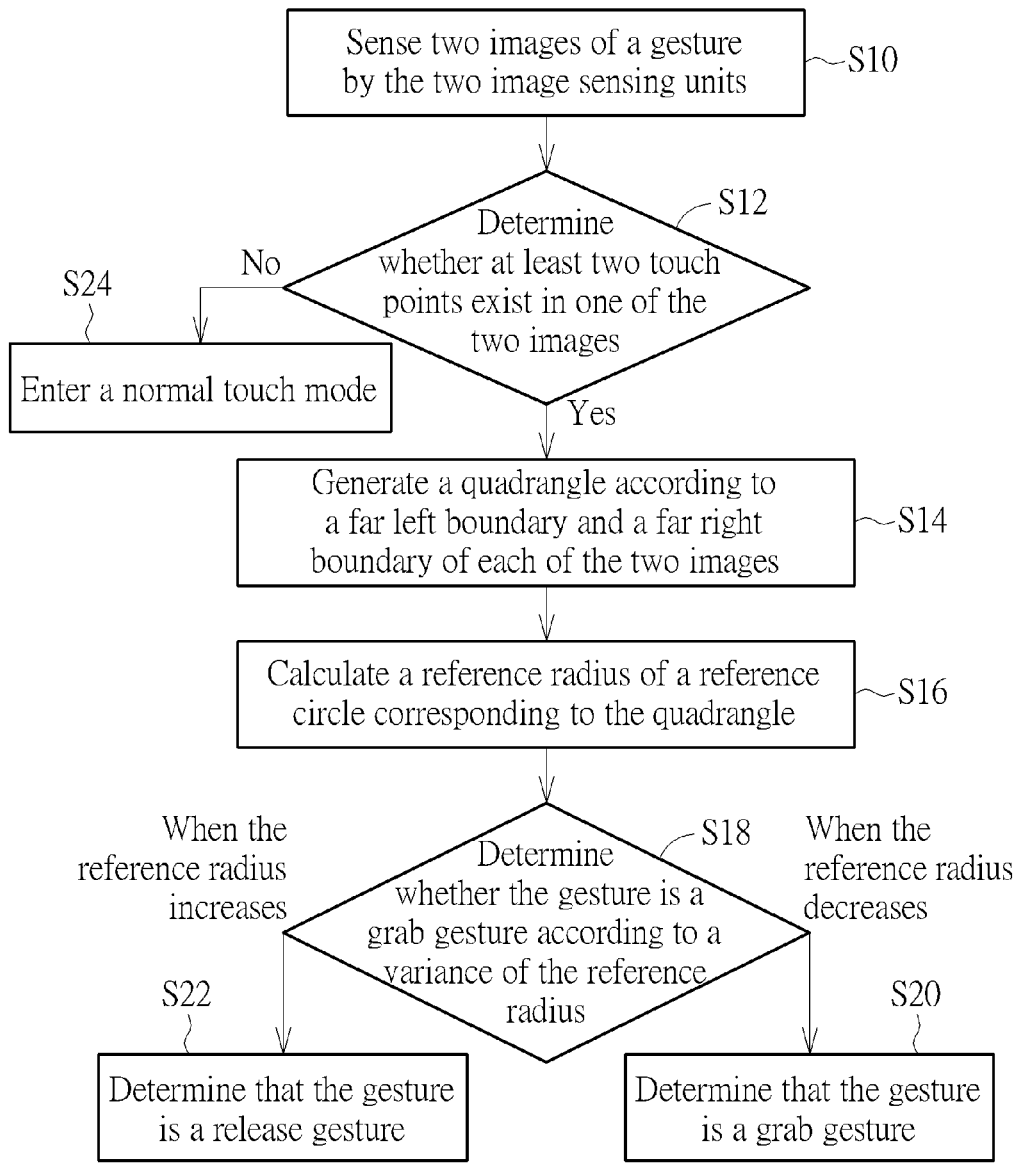
FIG. 3 is a flowchart illustrating a gesture detecting method according to an embodiment of the invention.

Referring to FIG. 3, FIG. 3 is a flowchart illustrating a gesture detecting method according to an embodiment of the invention. The gesture detecting method shown in FIG. 3 is adapted to the optical touch device 1 shown in FIGS. 1 and 2. Furthermore, the control logic of the gesture detecting method shown in FIG. 3 can be implemented by circuit and program design. First of all, step S10 is performed to sense two images I1, I2 of a gesture by the two image sensing units 12a, 12b, wherein the gesture is performed on the indication plane 10. Afterward, step S12 is performed to determine whether at least two touch points exist in one of the two images I1, I2. If at least two touch points exist in one of the two images I1, I2, step S14 is performed to generate a quadrangle 18 according to a far left boundary and a far right boundary of each of the two images I1, I2. Then, step S16 is performed to calculate a reference radius r of a reference circle 20 corresponding to the quadrangle 18. Then, step S18 is performed to determine whether the gesture is a grab gesture according to a variance of the reference radius r. When the reference radius r decreases, step S20 is performed to determine that the gesture is a grab gesture. When the reference radius r increases, step S22 is performed to determine that the gesture is a release gesture. It should be noted that if each of the two images I1, I2 does not contain at least two touch points in step S12, step S24 is performed to enter a normal touch mode. Moreover, the other operation principles of the gesture detecting method of the invention are mentioned in the above and those will not be depicted herein.

As mentioned in the above, the invention takes multiple touch points of a gesture performed on the indication plane to be a circle (i.e. the aforesaid reference circle) and then determines whether the gesture is a grab gesture according to the variance of the reference radius of the reference circle. Accordingly, no matter where the gesture is performed on the indication plane, the invention can determine whether the gesture is a grab gesture rapidly and accurately. Furthermore, the invention can further utilize the position variance of the reference center of the reference circle to calculate the moving trajectory of the gesture and then determine a moving direction and a shape of the gesture according to the moving trajectory, so as to provide various gesture definitions and applications thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A gesture detecting method adapted to an optical touch device, the optical touch device comprising an indication plane and two image sensing units disposed at two corners of one side of the indication plane, the gesture detecting method comprising:
    sensing two images of a gesture by the two image sensing units, wherein the gesture is performed on the indication plane;
    determining whether at least two touch points exist in one of the two images;
    if at least two touch points exist in one of the two images, generating a quadrangle according to a far left boundary and a far right boundary of each of the two images;
    calculating a reference radius of a reference circle corresponding to the quadrangle; and
    determining whether the gesture is a grab gesture according to a variance of the reference radius.

2. The gesture detecting method of claim 1, wherein the reference radius is calculated by an equation as follows, $r=2A/S$, r represents the reference radius, A represents an area of the quadrangle, and S represents a perimeter of the quadrangle.

3. The gesture detecting method of claim 1, further comprising:
- calculating a reference center of the reference circle; and
- calculating a moving trajectory of the gesture according to a position variance of the reference center.

4. The gesture detecting method of claim 3, further comprising:
- calculating an angular bisector between the far left boundary and the far right boundary of each of the two images, so as to obtain two angular bisectors; and
- taking an intersection point of the two angular bisectors to be the reference center.

5. The gesture detecting method of claim 1, wherein when the reference radius decreases, the gesture is determined as a grab gesture.

6. The gesture detecting method of claim 1, wherein when the reference radius increases, the gesture is determined as a release gesture.

7. The gesture detecting method of claim 1, further comprising:
- providing a look-up table, wherein the look-up table records a sensing range of each of the image sensing units and an angle range corresponding to the sensing range; and
- looking the far left boundary and the far right boundary of each of the two images up in the look-up table and calculating four straight lines according to the sensing range and the angle range, wherein the four straight lines intersect to form the quadrangle.

8. An optical touch device comprising:
- an indication plane, a gesture being performed on the indication plane;
- two image sensing units disposed at two corners of one side of the indication plane, the two image sensing units being used for sensing two images of the gesture; and
- a processing unit electrically connected to the two image sensing units, the processing unit being used for determining whether at least two touch points exist in one of the two images; if at least two touch points exist in one of the two images, the processing unit generating a quadrangle according to a far left boundary and a far right boundary of each of the two images, calculating a reference radius of a reference circle corresponding to the quadrangle, and determining whether the gesture is a grab gesture according to a variance of the reference radius.

9. The optical touch device of claim 8, wherein the reference radius is calculated by an equation as follows, $r=2A/S$, $r$ represents the reference radius, $A$ represents an area of the quadrangle, and $S$ represents a perimeter of the quadrangle.

10. The optical touch device of claim 8, wherein the processing unit calculates a reference center of the reference circle and calculates a moving trajectory of the gesture according to a position variance of the reference center.

11. The optical touch device of claim 10, wherein the processing unit calculates an angular bisector between the far left boundary and the far right boundary of each of the two images, so as to obtain two angular bisectors, and takes an intersection point of the two angular bisectors to be the reference center.

12. The optical touch device of claim 8, wherein when the reference radius decreases, the processing unit determines that the gesture is a grab gesture.

13. The optical touch device of claim 8, wherein when the reference radius increases, the processing unit determines that the gesture is a release gesture.

14. The optical touch device of claim 8, further comprising a storage unit electrically connected to the processing unit, the storage unit being used for storing a look-up table, wherein the look-up table records a sensing range of each of the image sensing units and an angle range corresponding to the sensing range, the processing unit looks the far left boundary and the far right boundary of each of the two images up in the look-up table and calculates four straight lines according to the sensing range and the angle range, the four straight lines intersect to form the quadrangle.

* * * * *